United States Patent [19]
Kuhnert et al.

[11] 3,843,812
[45] Oct. 22, 1974

[54] CONCENTRATED STABLE SOLUTIONS OF SOLID EDIBLE ACIDS, PROCESS OF MAKING, AND METHOD OF USING SAME

[75] Inventors: Peter Kuhnert, Mannheim; Doris Luetz-Binder, Neustadt, both of Germany

[73] Assignee: Joh A. Benckiser GmbH, Ludwigshafen am Rhein, Germany

[22] Filed: Apr. 21, 1972

[21] Appl. No.: 246,308

[30] Foreign Application Priority Data
Apr. 28, 1971 Germany............................ 2120846

[52] U.S. Cl........... 426/213, 252/363. 5, 260/484 B, 426/214, 426/221, 426/222, 426/380
[51] Int. Cl............................ A23g 3/00, A23l 1/26
[58] Field of Search................... 99/78, 134, 140 R; 260/484 B, 535 P; 127/29; 426/213, 221, 222; 252/363.5

[56] References Cited
UNITED STATES PATENTS

| | | | |
|---|---|---|---|
| 2,766,273 | 10/1956 | Bruins et al. | 260/484 P |
| 2,970,919 | 2/1961 | Perry | 99/134 R |
| 3,181,954 | 5/1965 | Inoue et al. | 99/78 |
| 3,556,811 | 1/1971 | Smith | 99/134 R |
| 3,649,647 | 3/1972 | Ota et al. | 99/134 R |
| 3,661,955 | 5/1972 | Centolella et al. | 260/484 B |

OTHER PUBLICATIONS

National Academy of Sciences, Chem. Used in Food Processing, 1965, pp. 41–46.
Furia, Handbook of Food Additives, 1968, pp. 268–271, 452–455.

*Primary Examiner*—Morris O. Wolk
*Assistant Examiner*—Sidney Marantz
*Attorney, Agent, or Firm*—Erich M. H. Radde

[57] ABSTRACT

Concentrated stable solutions of solid edible acids, for instance, of citric acid, malic acid, and others, are obtained by rapidly heating such acids with polyalcohols and rapidly cooling the resulting solution. Up to 30 percent of water and buffering salts may be present in said solutions. The solutions can be stored in the cold and are used as agents to impart a sour or tart taste to confections.

22 Claims, No Drawings

3,843,812

CONCENTRATED STABLE SOLUTIONS OF SOLID EDIBLE ACIDS, PROCESS OF MAKING, AND METHOD OF USING SAME

BACKGROUND OF THE INVENTION

1. Field of the Invention

The present invention relates to a process of producing concentrated, stable solutions of edible acids and more particularly of solid edible acids, as they are used as agents to impart to food and especially to confectionery an acid, sour, or tart taste, to such stable solutions, and to their use in the food industry and especially the confectionery industry.

2. Description of the Prior Art

Addition of edible acids is often required in the manufacture of confectionery for reasons of taste. However, when using such acids, difficulties are encountered because all edible acids cause inversion of saccharose in the presence of water, i.e., they effect cleavage to glucose and fructose. The fructose produced thereby renders the sweets, candies, and the like goods hygroscopic, sticky, and frequently deliquescent even in the cold.

To prevent inversion as far as possible, the acidulating agents, especially crystalline acids such as citric acid and tartaric acid are incorporated into the sugar composition after boiling. Batch-wise incorporation of the solid acids, however, is difficult, time consuming, and not economical. When producing candies and the like sweets by continuous manufacturing methods, it is usually necessary to add the edible acids in the proper amounts in fluid form so that they can be pumped.

For this reason liquid lactic acid has been added to the sugar preparation heretofore. It has also been discovered that the inverting action of lactic acid can be decreased by the addition of sodium lactate. Such a mixture of lactic acid and sodium lactate is known as buffered lactic acid. However, lactic acid as well as buffered lactic acid have a certain characteristic inherent taste which often imparts to the confections, sweets, and the like a peculiar and/or disagreeable aftertaste or, respectively, which prevents the various types of fruity taste from being fully developed.

Heretofore, other edible acids could not be used in continuously operating plants; for, these acids which as such are solid, are stable only in, at the most, 50 percent solution. This means that undesirably high amounts of water have to be added to the sweets, candies, and the like confections.

SUMMARY OF THE INVENTION

It is one object of the present invention to provide a simple process of producing highly concentrated solutions of solid edible acids which are stable and can be stored without crystallization and which overcome the heretofore encountered disadvantages of the use of edible acids in the confectionery industry.

Another object of the present invention is to provide new and valuable solutions of edible acids which are stable on storage and the addtion of which to confectionery compositions eliminates the disadvantages encountered heretofore when adding such acids to such compositions.

A further object of the present invention is to provide sweets, candies, and other confectionery containing stable solutions of edible acids as sour and tart taste imparting agents.

Other objects of the present invention and advantageous features thereof will become apparent as the description proceeds.

In principle the process according to the present invention comprises the steps of a. intimately mixing the solid edible acids alone or together with buffering salts with physiologically substantially inert polyalcohols which may contain up to 30 percent of water;

b. heating the mixture rapidly to a temperature between about 80° C. and about 150° C. and preferably between about 100° C. and about 140° C.; and c. rapidly cooling the resulting solution.

The concentrated, clear solutions of solid edible acids obtained according to the present invention can be stored in the cold without crystallization of the acids from their solutions. This is highly unexpected because said solutions are supersaturated. When heating the mixtures of acid and polyalcohol to 60° C. to 70° C. only, clear solutions are also obtained; but these solutions are unstable and the acid crystallizes therefrom on cooling. A comparison of the acid number and the saponification number of the solutions heated to a lower temperature with those heated to the higher temperature according to the present invention shows that ester formation takes place to some extent on heating to the higher temperatures. The theory is advanced, but the invention is not limited thereto, that the small amounts of ester formed during heating have a stabilizing effect upon the supersaturated solution. This is quite surprising because addition of a corresponding amount of preformed ester to the solution of the acid heated to a low temperature does not produce the same stabilizing effect.

The solutions of edible acids produced according to the present invention meet all the requirements of the confectionery industry. Their consistency can be adjusted to between highly viscous and highly fluid so that they can be conveyed by pumping. They are well miscible with boiled sugar compositions. They cause only very slight inversion of the sugar, especially when they contain buffering salts. Thus the candies and the like sweets do not become hygroscopic and, as a result thereof, soft and dull. In contrast to lactic acid and buffered lactic acid used heretofore for the same purpose the solutions according to the present invention impart to the candies and other sweets a purely sour, refreshing taste without any aftertaste. This advantage is, of course, of greatest importance in the manufacture of confectionery.

Suitable solvents are polyalcohols such as sorbitol and glucose in the form of their sirups, gluconic acid solutions, physiologically inert glycols as they are premitted in food, for instance, 1,2-propylene glycol, 1,3-butylene glycol, diethylene glycol, or glycerol. Mixtures of such polyalcohols can, of course, also be used.

If desired or required, buffering salts as they are commonly used in the food industry can be added to the solutions of edible acids according to the present invention. Suitable buffering salts are, for instance, the alkali metal salts of citric acid, gluconic acid, malic acid, and the like. They can be added in amounts up to 40 percent of the solution.

The concentrated solutions according to the present invention are obtained with all solid edible acids such as citric acid, tartaric acid, malic acid, gluconic acid, or the like. Of course, it is understood that, depending upon the desired taste characteristics of the confectionery to be produced, mixtures of different edible acids can be brought into solution. It is also possible to admix up to 20 percent of lactic acid to the solution of solid edible acids without in any way affecting the taste of the confectionery.

The solutions of edible acids according to the present invention are advantageously produced by first charging the reaction vessel with the liquid component, such as the sorbitol sirup, the glucose sirup, the glycols, or water, heating the same to 80°–90° C., adding thereto the solid components, such as the solid edible acids and, if desired, the buffering salts, and then heating the resulting crystalline slurry from a temperature of below 60° C. to the required reaction temperature of 80° C. to 150° C. and preferably of 100° C. to 140° C. as rapidly as possible while stirring. The time required for heating the mixture to the reaction temperature and for dissolving the solid acids must not exceed about 10 minutes and is preferably between about 30 seconds and about 3 minutes while the time during which the mixture is kept at the reaction temperature of 80° C. to 150° C. is between about 2 minutes and about 20 minutes. The resulting homogeneous, crystal-free soltuion is then cooled rapidly to a temperature below 60° C. To proceed under, and meet, these reaction conditions, the reaction mixture is passed preferably through a continuous flow heating system.

The resulting solution is fluid enough to be conveyed by pumping, clear, and free of crystals. It can be stored without separation of crystals. It can be used, for instance, for the continuous production of hard and soft caramel, i.e., firm but plastic candy as well as of jelly-like candies and other sweets.

DESCRIPTION OF THE PREFERRED EMBODIMENTS

The following examples serve to illustrate the present invention without, however, limiting the same thereto.

The following Table indicates the amounts of the components used for producing various solutions of edible acids according to the present invention:

The viscosity of the above given solutions, determined at a temperature of 20° C., is between about 5,000 cP. and about 25,000 cP. and can, of course, be varied depending upon the confectionery goods to which they are added.

The solutions composed as given in the Table are produced according to the following examples:

EXAMPLE 1

32 g. of sorbitol sirup of food quality and with a water content of 30 percent are heated to 80°–90° C. and mixed with 8 g. of tripotassium citrate. 42 g. of citric acid and 18 g. of 80 percent lactic acid are added to the heated mixture. The temperature of the resulting mixture is then increased to 120° C. while stirring continuously, and is maintained at 120° C. for 5 to 10 minutes. The resulting clear solution is cooled rapidly yielding a clear solution of citric acid and lactic acid of the composition 1 as given in the aforesaid Table.

| Acid number | 800 |
|---|---|
| Ester content calculated for the acids present | 4 % to 6 % |
| Water content | 15.4 % |
| pH-value in 1% solution | 2.6 |

EXAMPLE 2

A solution of the composition 4 of the Table is produced as described hereinabove in Example 1 whereby the citric acid is replaced by 50 g. of malic acid, the lactic acid is omitted, 20 g. of 70 percent sorbitol sirup and 20 g. of trisodium citrate are used in place of 32 g. of 70 percent sorbitol sirup and 8 g. of tripotassium citrate, and 10 g. of water are added, while otherwise the procedure is the same as described hereinabove.

EXAMPLE 3

A solution of the composition 8 of the Table is produced as described hereinabove in Example 1, whereby 50 g. of citric acid and 5 g. of trisodium citrate are dissolved in 45 g. of 92 percent glycerol by proceeding as described hereinabove. The resulting clear solution has a viscosity of 20,000 cP./20° C. and a pH of 2.5. It has a softening effect upon jelly candies, fruit caramels, and similar confections.

Table

| Components in g. | Composition of the solution | | | | | | | | | |
|---|---|---|---|---|---|---|---|---|---|---|
| | 1 | 2 | 3 | 4 | 5 | 6 | 7 | 8 | 9 | 10 |
| Citric acid | 42 | 60 | | | | 60 | 40 | 50 | | |
| Malic acid | | | 50 | 50 | 45 | | | | 45 | 45 |
| Lactic acid 80 % | 18 | | 15 | | | | 20 | | | 5 |
| Potassium citrate | 8 | | | | 15 | | | | | |
| Sodium citrate | | | | 20 | | | | 5 | | |
| Potassium gluconate | | 30 | | | | | | | | |
| Sodium gluconate | | | | | | 10 | | | 10 | 10 |
| Sorbitol sirup 70 % | 32 | | | 20 | 45 | | | | | |
| Glucose sirup 80 % | | | | | | | 40 | | 40 | 40 |
| Glycerol 92 % | | | | | | | | 45 | | |
| Glycols | | | 35 | | | 35 | | | | |
| Water | | 10 | | 10 | | | | 5 | | |

EXAMPLE 4

30 g. of potassium gluconate are dissolved in 10 g. of water heated to 100° C. 60 g. of citric acid are added thereto at said temperature. The resulting crystalline slurry which is fluid enough even at a temperature of 50° C. so that it can be pumped, is continuously passed through a continuous flow heater and is heated on its passage therethrough at 120° C. for one minute or at 110° C. for three minutes, and is then cooled rapidly. A clear and stable solution of citric acid is obtained thereby.

| | |
|---|---|
| Acid number | 850 |
| Ester content calculated for the acid present | 3 % to 5 % |
| Viscosity | about 20,000 cP./20°C. |
| Color | slightly yellowish |
| Water content | 10 % |
| pH-value in 1% solution | 2.8 |

By increasing or reducing the amount of water by +3 percent or −3 percent, the viscosity of the stable solution can be varied. Likewise by increasing or decreasing the amount of potassium gluconate by +10 percent or −10 percent, the degree of buffering action and, as a result thereof, the power of inversion of the solution can also be varied.

EXAMPLE 5

50 g. of DL-malic acid and 15 g. of 80 percent lactic acid are added to 35 g. of 1,3-dipropylene glycol heated to 80° C. while stirring. The resulting mixture is heated rapidly to 110°–130° C. while stirring continuously, is kept at said temperature for, at the most, 5 minutes, and is cooled rapidly. A thinly liquid acid sirup of a very low water content which is not buffered, is obtained thereby. Its viscosity is about 20,000 cP., the pH of a 10 percent solution is 2.2.

EXAMPLE 6

The procedure is the same as described in Example 5 whereby, however, the malic acid and lactic acid are replaced by 60 g. of citric acid and the dipropylene glycol by diethylene glycol, and 15 g. of tripotassium citrate are added. The resulting thinly liquid acid sirup of the composition 6 of the Table can be conveyed by pumping.

EXAMPLE 7

The procedure is the same as described in Example 1 whereby, however, the citric acid and lactic acid are replaced by 45 g. of malic acid and the tripotassium citrate by 10 g. of sodium gluconate, while 45 g. of 70 percent sorbitol sirup are added in place of 32 g. thereof. A clear and stable malic acid solution of the composition 5 of the Table is obtained thereby.

EXAMPLE 8

The procedure is the same as described in Example 1 whereby, however, 40 g. of citric acid and 20 g. of 80 percent lactic acid are used in place of 42 g. of citric acid and 18 g. of 80 percent lactic acid, the sorbitol sirup is replaced by 40 g. of 80 percent glucose sirup, and the potassium citrate is omitted. The resulting clear and stable solution of the composition 7 of the Table which is not buffered, is obtained.

EXAMPLE 9

40 g. of 80 percent glucose sirup and 5 g. of water are heated carefully to 80° C. 10 g. of sodium gluconate and 45 g. of malic acid are added to the resulting warm solution. The mixture is heated rapidly to at least 120° C. and, after heating for at least two minutes at said temperature is cooled rapidly. A clear stable solution of malic acid corresponding to composition 9 of the Table is obtained thereby.

EXAMPLE 10

40 g. of 80 percent glucose sirup and 5 g. of 80 percent lactic acid are heated carefully to 80° C. 10 g. of sodium gluconate and 45 g. of malic acid are added to the resulting warm solution. The mixture is heated rapidly to at least 120° C. and, after heating for at least two minutes at said temperature, is cooled rapidly. A clear stable solution of malic acid corresponding to composition 10 of the Table is obtained thereby.

In place of glucose sirup and sorbitol sirup as used in Examples 1, 2, and 7 to 10, it is also possible to use glucose or sorbitol in solid form with the necessary additional amount of water.

Of course, other solid edible acids, which can be used as acidifying agents in the manufacture of confectionery, other physiologically inert polyalcohols and buffering salts than those given in the examples can be employed for preparing the solutions according to the present invention, whereby the procedure is about the same as or similar to that described in the preceding examples.

Confectionary preparations to which a sour or tart taste has been imparted by the addition of the acid solutions according to the present invention, are prepared by methods well known to the art. The following example illustrate the manufacture of confectionery goods with the addition of the concentrated stable solutions of edible acids according to the present invention without, however, limiting the same thereto.

EXAMPLE 11

100 parts of granulated sugar (sucrose) are dissolved in 25 parts of water. The solution is mixed with 60 parts of glucose sirup and the mixture is heated in a precooker to 105°–110° C. The heated mixture is fed into a cooker heated by indirect steam heating to 135°–140° C., finally under vacuum until the water is almost completely evaporated.

To impart to said cooked mixture a sour and tart taste, 3.0 parts of the composition of Example 1 and the desired flavoring and coloring agents are admixed to the cooked batch while still hot. The resulting homogeneous mixture is poured into molds while still fluid and is allowed to cool and harden.

In place of the buffered acid composition of Example 1, there can be admixed the buffered acid compositions of Examples 2, 3, 6, or 10 to the cooked sugar batch.

The not buffered acid compositions of Examples 4, 5, 7, 8, and 9 can also be added. They are preferably admixed shortly before the cooled sugar batch starts to harden, i.e. while the consistency of the cooled sugar batch still permits homogeneous distribution of the acid compositions within said batch.

Of course, other ingredients such as milk or milk products, fats, starch, colloids, for instance, pectin, gelatin, protein whipping agents, natural gums, nuts, fruits, and others may also be admixed to the sugar batch in order to produce the various types of confectionery such as hard candy, fondant or sugar cream, fudge, caramels, nougat, sugar lozenges, gums and jellies, and the like.

In general the acid compositions according to the present invention have proved to be useful in all those instances where a low water content but a fluid consistency is required.

Comparative tests which were carried out with the acid solutions of the present invention and with pure citric acid added to the cooled sugar batch in amounts imparting thereto the same sour taste, showed that addition of pure citric acid produced about three to six times as much invert sugar than addition of the acid solutions of this invention.

We claim:

1. In a process of producing a concentrated stable solution of a solid edible carboxylic acid, the steps which comprise
   a. intimately mixing the solid edible carboxylic acid with a physiologically substantially inert polyalcohol,
   b. rapidly heating the mixture to a temperature between about 80°C. and about 150°C. within a period of time not substantially exceeding about 10 minutes to cause dissolution of the edible acid in the polyalcohol,
   c. maintaining the mixture at said temperature for a period of time sufficient to produce a clear solution of the edible carboxylic acid in the polyalcohol, and
   d. rapidly cooling the resulting solution to a temperature below about 60°C.

2. The process of claim 1, in which the polyalcohol is a polyalcohol containing up to about 30 percent of water.

3. The process of claim 1, in which in step (b) the mixture is rapidly heated to a temperature between about 100° C. and about 140° C.

4. The process of claim 1, in which the polyalcohol is a polyalcohol selected from the group consisting of sorbitol in the form of its sirup, glucose in the form of its sirup, gluconic acid in the form of its concentrated aqueous solution, diethylene glycol, dipropylene glycol, glycerol, propylene glycol, and butylene glycol.

5. The process of claim 1, in which the solid edible carboxylic acid is an acid selected from the group consisting of citric acid, malic acid, gluconic acid, and tartaric acid.

6. The process of claim 1, in which in step (a) lactic acid is added to the edible carboxylic acid and the polyalcohol in an amount not exceeding about 20 percent.

7. The process of claim 1, wherein the mixture is maintained at said temperature in step (c) for a period of time sufficient to produce a clear solution of the edible carboxylic acid in the polyalcohol and to produce an edible carboxylic acid/polyalcohol ester content of between about 3 percent and about 6 percent.

8. The process of claim 1, in which the polyalcohol is present in the resulting solution in an amount not substantially exceeding about 50 percent.

9. The process of claim 8, in which the polyalcohol is present in the resulting solution in an amount between about 20 percent and about 45 percent.

10. The process of claim 1, in which in step (b) the mixture of solid edible carboxylic acid and polyalcohol is heated to a temperature between about 80° C. and about 150° C. within a period of time not substantially exceeding about 10 minutes and is kept at said temperature for about 2 minutes to about 20 minutes to produce a clear solution of the edible carboxylic acid in the polyalcohol.

11. The process of claim 10, in which in step (b) the mixture of solid edible carboxylic acid and polyalcohol is heated to a temperature between about 80° C. and about 150° C. within about 30 seconds and about 3 minutes.

12. The process of claim 1, in which in step (a) the edible carboxylic acid and the polyalcohol are mixed with a buffering salt.

13. The process of claim 12, in which the buffering salt is admixed in an amount not substantially exceeding about 40 percent of the mixture.

14. The process of claim 12, in which the buffering salt is a salt selected from the group consisting of an alkali metal citrate, an alkali metal gluconate, and an alkali metal malate.

15. A clear, supersaturated solution of a solid edible carboxylic acid in a physiologically substantially inert polyalcohol, said solution containing between about 40 percent and about 60 percent of the solid edible carboxylic acid, being stable, not crystallizing on prolonged storage in the cold, being pumpable, and having a content between about 3 percent and about 6 percent of an ester of said edible carboxylic acid and said polyalcohol, said solution imparting to confectionery products an agreeable, sour, refreshing taste without any objectionable aftertaste.

16. The solution of claim 15 additionally containing a buffering salt in an amount not substantially exceeding about 40 percent.

17. The solution of claim 15, additionally containing water in an amount not substantially exceeding about 30 percent.

18. The solution of claim 15, additionally containing lactic acid in an amount not substantially exceeding about 20 percent.

19. Confectionery goods containing as sour taste imparting agent the solution of claim 15.

20. In a process of imparting sour taste to confectionery goods, the step which consists in continuously admixing the solution of claim 15 to such goods during their continuous manufacturing processes.

21. The solution of claim 15, wherein said edible carboxylic acid is selected from the group consisting of citric acid, malic acid, gluconic acid and tartaric acid.

22. The solution of claim 15, wherein said polyalcohol is selected from the group consisting of sorbitol in the form of its sirup, glucose in the form of its sirup, gluconic acid in the form of its concentrated aqueous solution, diethylene glycol, dipropylene glycol, glycerol, propylene glycol, and butylene glycol.

* * * * *